United States Patent
Kurosu et al.

(10) Patent No.: US 10,056,180 B2
(45) Date of Patent: Aug. 21, 2018

(54) SEAL STRUCTURE FOR ELECTROMAGNETIC LEAD WIRE

(71) Applicant: OGURA CLUTCH CO., LTD., Gunma (JP)

(72) Inventors: Yoshihiro Kurosu, Gunma (JP); Takashi Yamaguchi, Gunma (JP); Haruhiko Ushirode, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 0 days.

(21) Appl. No.: 15/479,061

(22) Filed: Apr. 4, 2017

(65) Prior Publication Data

US 2017/0287612 A1  Oct. 5, 2017

(30) Foreign Application Priority Data

Apr. 5, 2016 (JP) .................................. 2016-075699

(51) Int. Cl.
*H01F 7/00* (2006.01)
*H01F 7/20* (2006.01)
*F16D 27/00* (2006.01)

(52) U.S. Cl.
CPC ............... *H01F 7/20* (2013.01); *F16D 27/00* (2013.01); *F16D 2027/001* (2013.01)

(58) Field of Classification Search
CPC . H01F 7/20; F16D 67/06; F16D 27/14; F16D 27/112
USPC ........................................................ 335/278
See application file for complete search history.

(56) References Cited

U.S. PATENT DOCUMENTS

| 5,121,093 | A | 6/1992 | Matsushita | |
| 6,371,270 | B1 | 4/2002 | Matsumoto | |
| 2008/0194340 | A1* | 8/2008 | Kurosu | F16D 7/046 464/45 |
| 2008/0271714 | A1* | 11/2008 | Mitsuhashi | F02M 37/08 123/497 |
| 2009/0314600 | A1* | 12/2009 | Kato | F16D 27/105 192/84.31 |

(Continued)

FOREIGN PATENT DOCUMENTS

| JP | H04131525 | 5/1992 |
| JP | H06-058347 A | 3/1994 |
| JP | H11063020 | 3/1999 |

OTHER PUBLICATIONS

Ogura Clutch Co., Ltd., "Extended European Search Report," EP Application No. 17163750.7 (dated Sep. 22, 2017).

*Primary Examiner* — Shawki S Ismail
*Assistant Examiner* — Lisa Homza
(74) *Attorney, Agent, or Firm* — Womble Bond Dickinson (US) LLP

(57) ABSTRACT

A seal structure for an electromagnet lead wire includes an annular yoke including an annular groove, a wiring hole configured to pass a lead wire of an exciting coil, an insulating resin configured to seal the exciting coil, and a seal member arranged in the hole. The wiring hole includes a though hole of a case, and a concave portion of the yoke. The insulating resin includes a projecting portion whose distal end face is located in the concave portion. The seal member includes a columnar portion inserted into the though hole, and a flange portion located in the concave portion. The flange portion is sandwiched and compressed between the device inner surface of the case and the distal end face of the insulating resin.

9 Claims, 14 Drawing Sheets

(56) References Cited

U.S. PATENT DOCUMENTS

| | | | |
|---|---|---|---|
| 2011/0048888 A1* | 3/2011 | Kurosu | F16D 27/112 192/84.1 |
| 2012/0111690 A1* | 5/2012 | Kurosu | F16D 27/01 192/84.9 |
| 2016/0252143 A1* | 9/2016 | Kato | F16D 43/215 192/46 |
| 2016/0281809 A1* | 9/2016 | Kurosu | F16D 27/14 |
| 2017/0198760 A1* | 7/2017 | Saito | F16D 27/112 |

* cited by examiner

RELATED ART

SEAL STRUCTURE FOR ELECTROMAGNETIC LEAD WIRE

BACKGROUND OF THE INVENTION

The present invention relates to a seal structure for an electromagnet lead wire, which includes an insulating resin for sealing the coil of an electromagnet and a seal member through which the electromagnet lead wire extends.

When arranging an electromagnet in a mechanical device to which lubricating oil is supplied, a seal structure configured to prevent the oil from adhering to the lead wires of the electromagnet is necessary. This is because the insulating coating of the lead wires is degraded by the oil.

As a mechanical device incorporating an electromagnet, there is a differential device disclosed in, for example, Japanese Patent Laid-Open No. 6-58347 (literature 1). In this differential device, parts to which oil is supplied and a wet type electromagnetic clutch including an electromagnet and configured to limit an operation are stored the same case. The parts to which oil is supplied are a differential gear mechanism, a main clutch, a ball cam, a bearing, and the like.

The electromagnet disclosed in literature 1 includes an annular yoke, and an exciting coil stored in the annular groove of the yoke. The yoke is attached to the case in a state in which the bottom wall serving as the bottom of the annular groove is in contact with the case of the differential device. The annular groove is filled with an insulating resin used to insulate the coil from outside. The coil is sealed in the annular groove by the insulating resin and fixed to the yoke in this state.

Two lead wires are electrically connected to the exciting coil. These lead wires are extracted from the device through the bottom wall of the yoke and the case. The lead wire outlet of the yoke is provided with a seal member made of rubber in which the lead wires are press-fitted. The seal member prevents oil or rainwater from entering the annular groove through the lead wire outlet. A seal structure having such a seal member can be configured as shown in, for example, FIG. 15.

A seal structure 1 for an electromagnet lead wire shown in FIG. 15 includes a seal member 5 that seals a portion where lead wires 3 of an electromagnet 2 extend through a case 4 of a mechanical device (not shown). The electromagnet 2 includes an annular yoke 6. The yoke 6 is formed into an annular shape with an axis in the left-and-right direction in FIG. 15. The yoke 6 is provided with an annular coil storage groove 7, and is attached to the case 4 in a state in which an annular wall 8 serving as the bottom of the coil storage groove 7 is in contact with a device inner surface 4*a* of the case 4.

An exciting coil 9 and an annular resin plate 10 are inserted into the coil storage groove 7 together with a coil bobbin 11. The winding start end and the winding terminal end of the exciting coil 9 are connected to the lead wires 3 via solderless terminals (not shown). The lead wires 3 are extracted from the coil bobbin 11 through a lead wire holding portion 12 of the coil bobbin 11 and extend to the outside of the yoke 6 through an insertion hole 13 of the seal member 5. One end of the insertion hole 13 opens to the bottom of the coil storage groove 7, and the other end opens to a concave portion 14 formed at the case-side end of the yoke 6. The concave portion 14 is formed by cutting at the end of the yoke 6.

The coil storage groove 7 and the insertion hole 13 are filled with an insulating resin 15. The exciting coil 9 and the above-described solderless terminals are sealed by the insulating resin 15. A portion of the lead wire 3 extracted from the lead wire holding portion 12 of the coil bobbin 11 extends through the seal member 5 made of an elastic material. The lead wire 3 is fitted in the seal member 5 in a press-fitted state.

The seal member 5 is formed from a columnar portion 17 inserted into a through hole 16 of the case 4, and a plate-shaped portion 18 stored in the concave portion 14 of the yoke 6. The plate-shaped portion 18 is sandwiched and compressed between the case 4 and the bottom surface of the concave portion 14 of the yoke 6. A seal portion 19 having a circular section is provided at the outer edge portion of the plate-shaped portion 18.

According to the thus formed seal structure 1, the lead wire outlet (concave portion 14) of the yoke 6 is sealed by the seal member 5. It is therefore possible to prevent lubricating oil in the case 4 or rainwater outside the case from entering the solderless terminal portions or the exciting coil 9 and also prevent an insulation fault from occurring due to corrosion.

However, if the seal structure 1 as shown in FIG. 15 is used in the field of the wet type electromagnetic clutch of a differential device as described in literature 1, a problem to be described below may arise. The differential device is a device that vibrates. When the vibration is transmitted to the seal structure 1, and the seal structure 1 vibrates for a long time, the insulating resin 15 may peel off from the inner wall surface of the coil storage groove 7 of the yoke 6 or the hole wall surface of the insertion hole 13. If the insulating resin 15 peels off from the yoke 6, a small gap is formed between the insulating resin 15 and the yoke 6, and the oil in the case 4 enters this gap. The oil penetrates to the side of the concave portion 14 through the gap of the peeled portion, moves along the insulating resin 15, and reaches the lead wire 3 from the inside of the concave portion 14. The oil then passes between the insulating resin 15 and the outer surface of the coating of the lead wire 3 and penetrates to the side of the exciting coil 9. For this reason, an insulation fault may occur in the exciting coil 9 due to corrosion.

On the other hand, the oil in the case 4 also enters the concave portion 14 from the joining portion between the yoke 6 and the case 4. If the concave portion 14 is formed by machining, the oil that has entered the concave portion 14 via the entry path can hardly be sealed by the plate-shaped portion 18 of the seal member 5. The bottom surface of the concave portion 14 formed by machining is a cut surface with small unevenness. Even if the plate-shaped portion 18 is brought into tight contact with such a cut surface, it is impossible to completely eliminate gaps. Hence, the oil that has entered the concave portion 14 via the joint surface between the case 4 and the yoke 6 passes between the plate-shaped portion 18 and the bottom surface of the concave portion 14, leaks to the side of the lead wire 3, and penetrates to the side of the exciting coil 9, as described above. Even if the O-ring shaped seal portion 19 with a circular section is provided at the outer edge of the plate-shaped portion 18, the sealing effect cannot be obtained as expected, and improvement is needed from the viewpoint of a moisture resistance and waterproofness.

SUMMARY OF THE INVENTION

The present invention has been made to solve the above-described problems, and has as its object to provide a seal structure for an electromagnet lead wire, which ensures high sealing properties for a portion through which the lead wire of an exciting coil extends.

In order to achieve the above-described object, according to the present invention, there is provided a seal structure for an electromagnet lead wire, comprising an annular yoke including an annular groove configured to store an exciting coil, a wiring hole extending in an axial direction of the yoke, opening to a bottom of the annular groove and an outside of the seal structure and configured to pass a lead wire connected to the exciting coil, an insulating resin configured to seal the exciting coil and a connecting portion between the exciting coil and the lead wire, and a seal member made of an elastic material and arranged in the wiring hole in a state in which the lead wire is liquid-tightly fitted, wherein the wiring hole includes a first hole portion including one end and the other end opening to the outside of the seal structure, and a second hole portion connected to the one end of the first hole portion and having an opening width larger than an opening width of the first hole portion, the insulating resin extends from an inside of the annular groove up to the second hole portion, and includes a projecting portion including a distal end face orthogonal to the axial direction in the second hole portion, the seal member includes a columnar portion inserted into the first hole portion, a plate-shaped portion extending in a direction orthogonal to the axial direction in the second hole portion, and a through hole extending through the columnar portion and the plate-shaped portion and configured to receive the lead wire, and the plate-shaped portion is sandwiched and compressed between the distal end face of the projecting portion and a hole wall surface extending from a boundary between the first hole portion and the second hole portion in the direction orthogonal to the axial direction.

DESCRIPTION OF THE PREFERRED EMBODIMENTS

First Embodiment

A seal structure for an electromagnet lead wire according to the first embodiment of the present invention will be described below in detail with reference to FIGS. 1 to 12.

Figure 1:
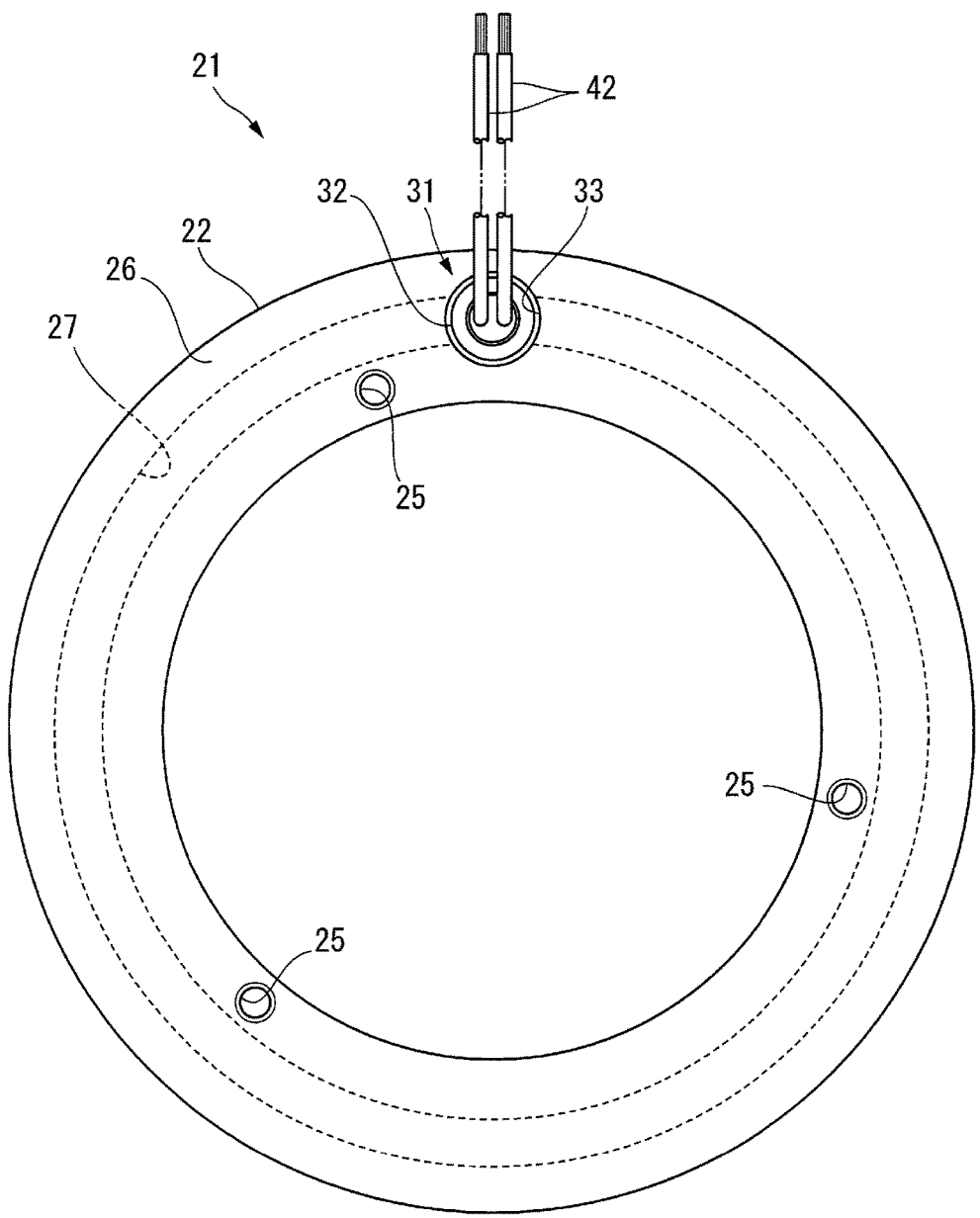
FIG. 1 is a rear view of an electromagnet that employs a seal structure for an electromagnet lead wire according to the first embodiment.
Figure 12:
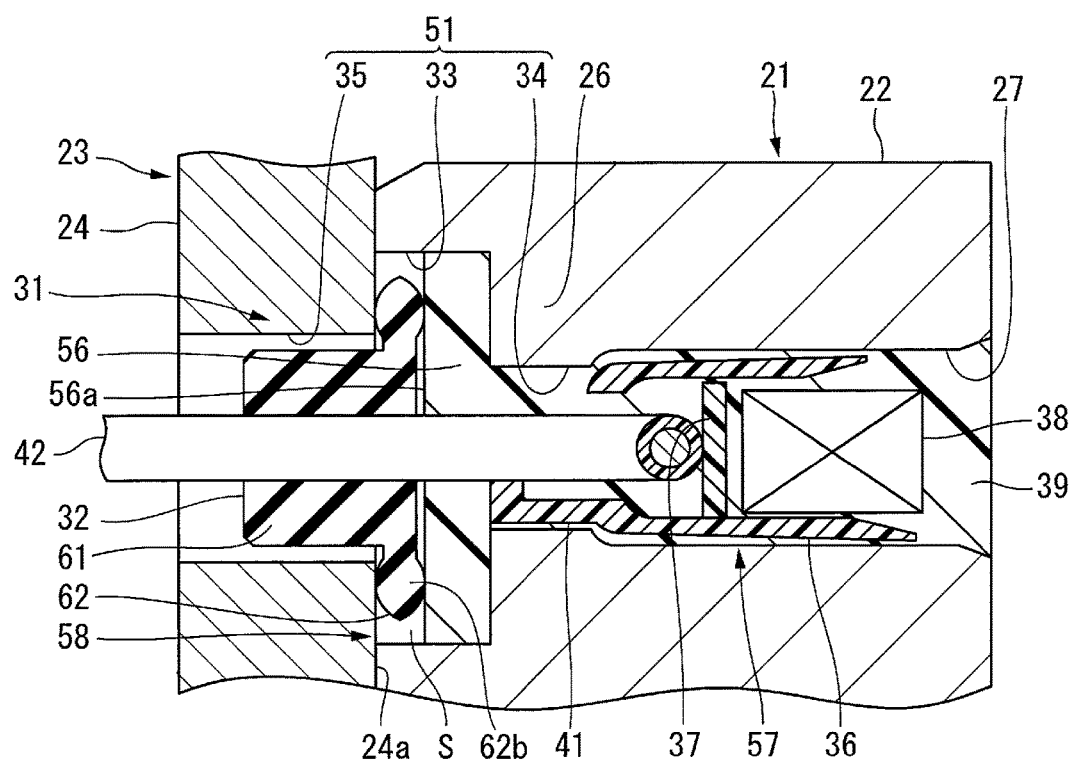
FIG. 12 is a sectional view showing a state in which the electromagnet is attached to a case.

An electromagnet 21 shown in FIG. 1 is formed by assembling components to be described later to an annular yoke 22. The electromagnet 21 according to this embodiment forms the field of a wet type electromagnetic clutch attached to a differential device (not shown) as a mechanical device. As shown in FIG. 12, the electromagnet 21 is used in a state in which one end of the yoke 22 in the axial direction (the left-and-right direction in FIG. 12) is attached to a case 24 of a mechanical device 23. The yoke 22 is fixed on a device inner surface 24a of the case 24. In the mechanical device 23, a lubricating oil is supplied into the device, although not illustrated. The electromagnet 21 is placed in an environment where the oil scatters in the mechanical device 23. Bolts (not shown) used to attach the electromagnet 21 to the case 24 are screwed into a plurality of screw holes 25 (see FIG. 1) provided in the inner surface of the yoke 22. These screw holes 25 are formed in an annular wall 26 located at one end of the annular yoke 22 in the axial direction.

Figure 2:
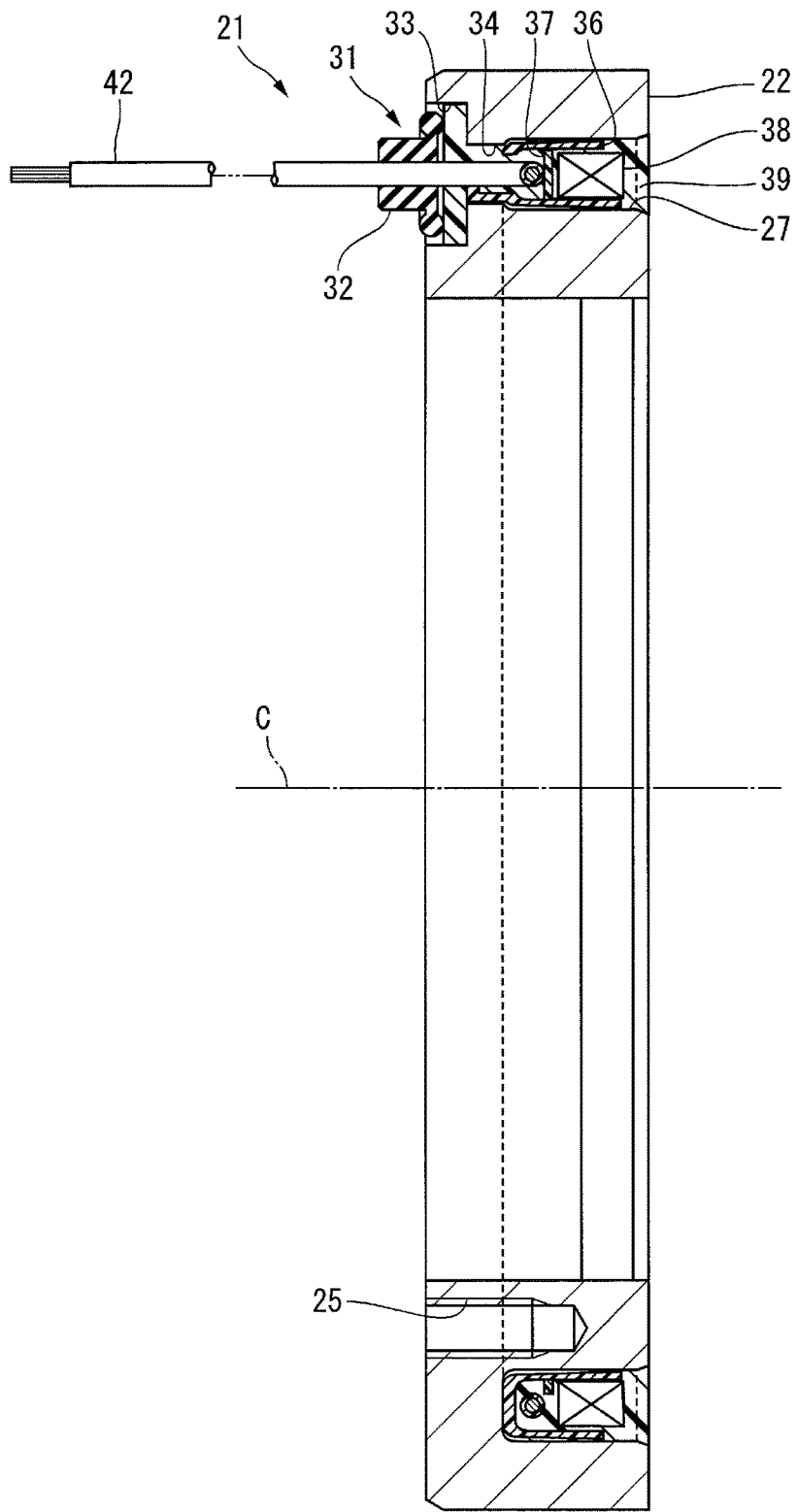
FIG. 2 is a longitudinal sectional view of the electromagnet.

The yoke 22 is made of a magnetic material such as low carbon steel for a mechanical structure, and includes an annular coil storage groove 27 located on the same axis as an axis C, as shown in FIG. 2. The coil storage groove 27 opens to the other end (the end on the right side in FIG. 2) of the yoke 22 in the axial direction. In this embodiment, the coil storage groove 27 corresponds to "annular groove" of the present invention.

Figure 3:
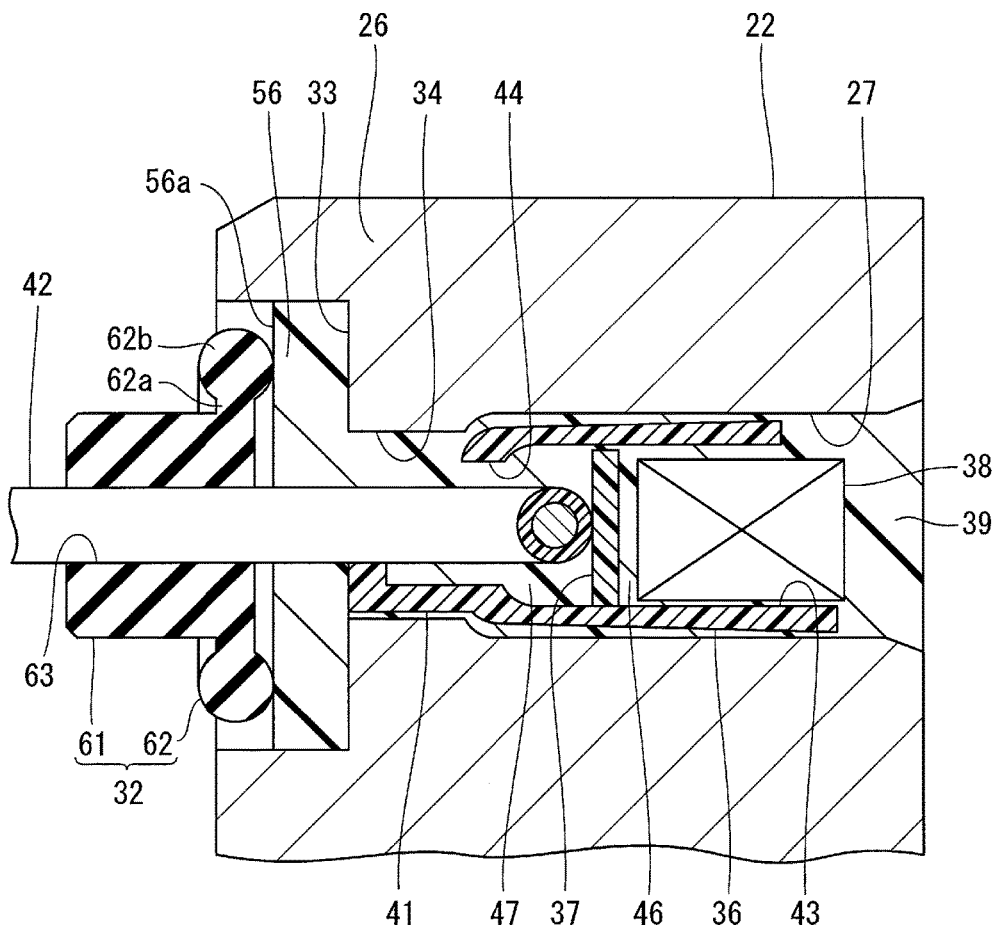
FIG. 3 is an enlarged sectional view of a main part.

As shown in FIG. 1, a seal member 32 that forms part of a seal structure 31 for an electromagnet lead wire according to this embodiment is mounted on the annular wall 26 of the yoke 22. The seal member 32 is inserted into a concave portion 33 formed in the annular wall 26, as will be described later in detail. The opening of the concave portion 33 has a circular shape. As shown in FIG. 3, the concave portion 33 communicates with the coil storage groove 27 via an insertion hole 34. The insertion hole 34 extends in the axial direction of the yoke 22. One end of the insertion hole 34 opens to the bottom of the coil storage groove 27, and the other end opens to the bottom of the concave portion 33. The opening of the insertion hole 34 has an arc shape when viewed from the axial direction of the yoke 22.

The opening widths (the widths in the circumferential direction and the widths in the radial direction of the yoke 22) of the coil storage groove 27 and the insertion hole 34 are smaller than the hole diameter (opening width) of the concave portion 33. As shown in FIG. 12, the hole diameter of the concave portion 33 is larger than the hole diameter (opening width) of a through hole 35 formed in the case 24 at a position adjacent to the concave portion 33. The concave portion 33 is connected to one end of the through hole 35 of the case 24 close to the coil storage groove 27.

Figure 4:
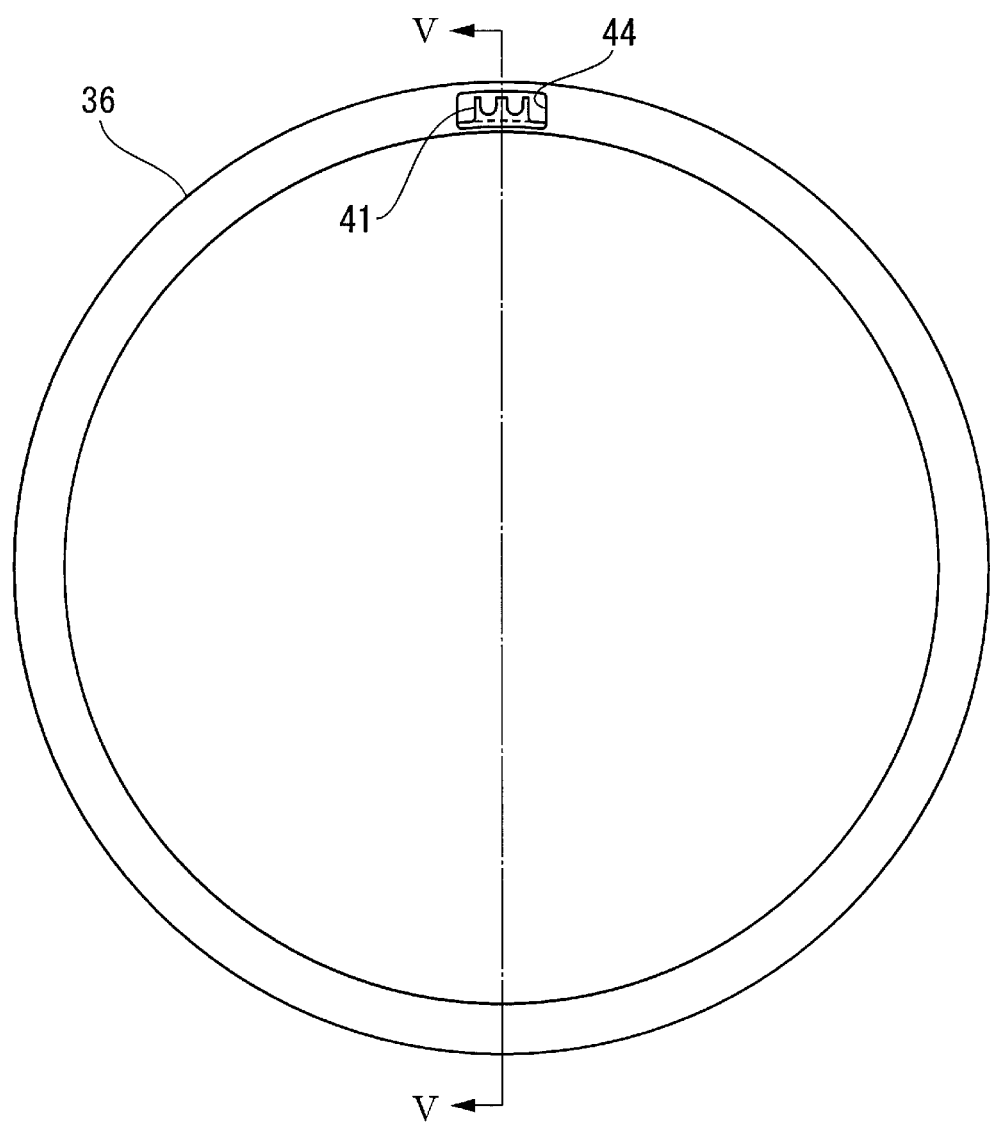
FIG. 4 is a rear view of a coil bobbin.
Figure 5:
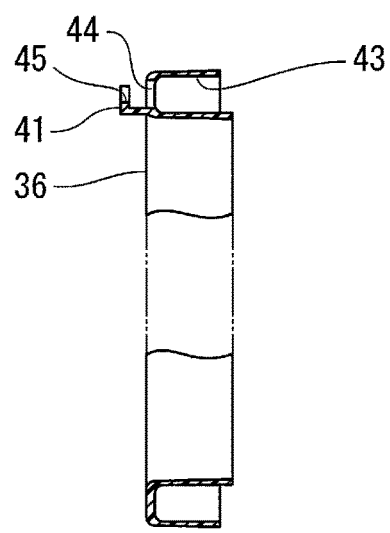
FIG. 5 is a sectional view taken along a line V-V in FIG. 4.

As shown in FIG. 3, the coil storage groove 27 stores a coil bobbin 36, a resin plate 37 provided in the coil bobbin 36, and an exciting coil 38, and is filled with an insulating resin 39 for sealing. As shown in FIGS. 4 and 5, the coil bobbin 36 is formed into an annular shape, and includes a lead wire holding portion 41 projecting in the axial direction from one end of the coil bobbin 36 in the axial direction. The lead wire holding portion 41 is configured to hold lead wires 42 (see FIG. 3) to be described later. The coil bobbin 36 includes an annular concave portion 43, as shown in FIG. 5. The annular concave portion 43 opens to the other end (the end on the right side in FIG. 5) of the coil bobbin 36. A hole 44 for lead wire extraction is formed at a portion of the bottom of the annular concave portion 43 corresponding to the lead wire holding portion 41.

Figure 6:
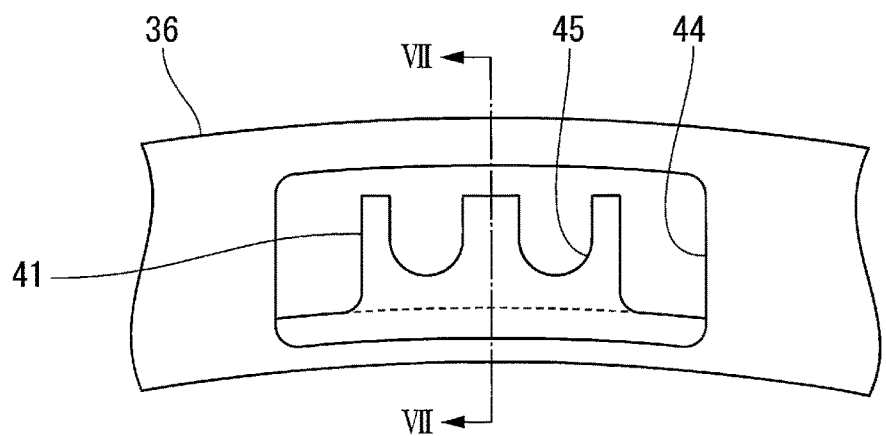
FIG. 6 is an enlarged rear view of the lead wire holding portion of the coil bobbin.
Figure 7:
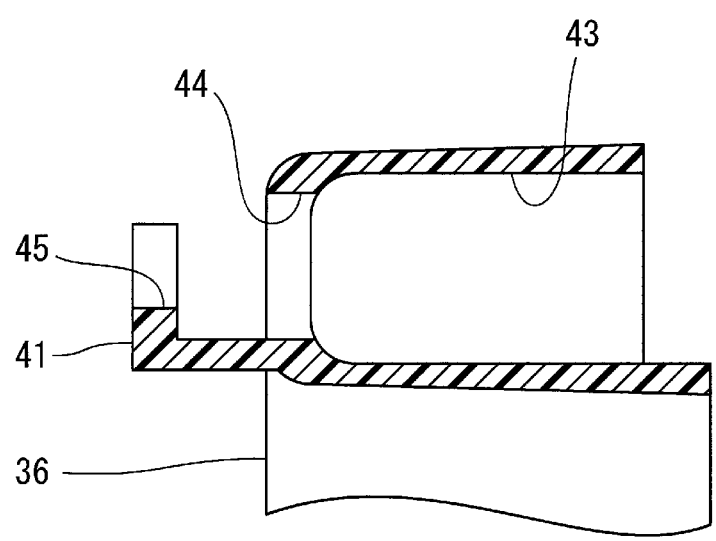
FIG. 7 is a sectional view taken along a line VII-VII in FIG. 6.

As shown in FIGS. 6 and 7, the lead wire holding portion 41 is formed by a projecting piece having an L-shaped section and projecting from one end of the coil bobbin 36. U-shaped notches 45 are provided at the projecting-side end of the lead wire holding portion 41. Each notch 45 is formed into a shape in which the lead wire 42 is detachably fitted.

Figure 8:
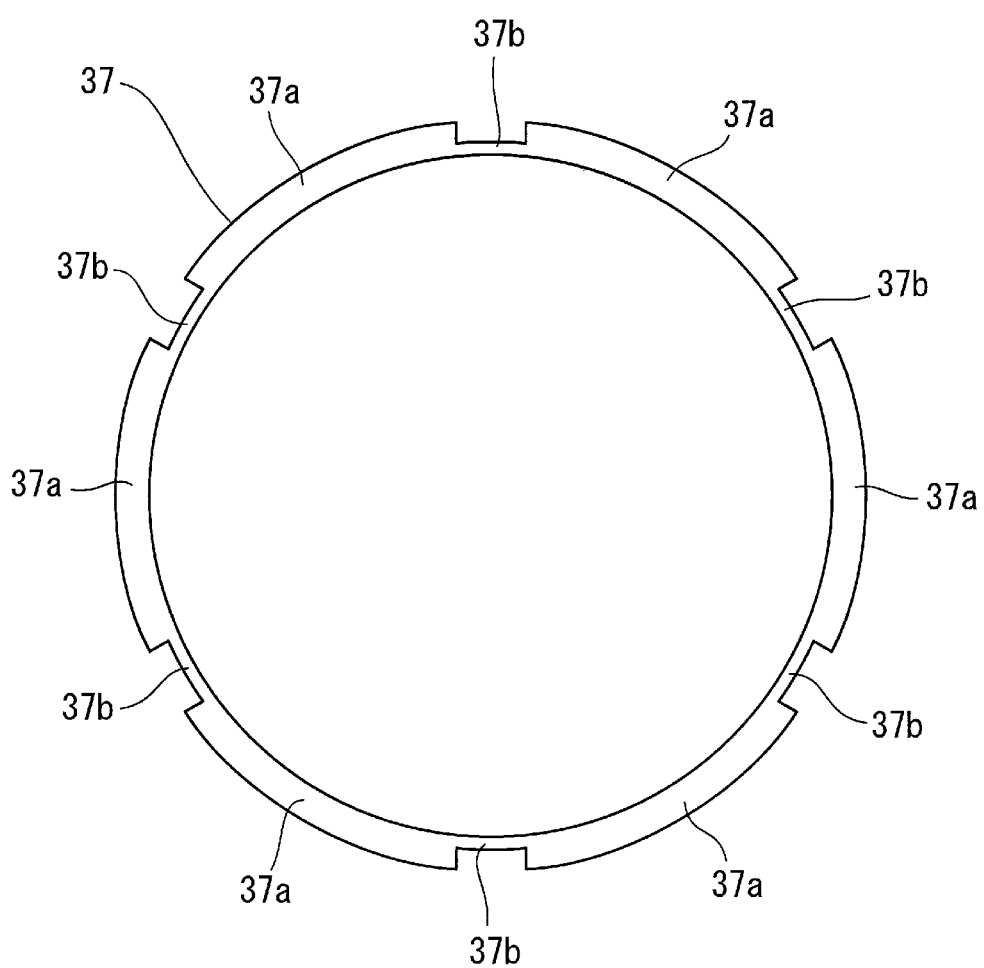
FIG. 8 is a rear view of a resin plate.

As shown in FIG. 8, the resin plate 37 arranged in the coil bobbin 36 is formed into an annular shape and fitted in the annular concave portion 43 of the coil bobbin 36. The internal space of the coil bobbin 36 is divided by the resin plate 37 into a coil storage space 46 located on the other end side in the axial direction and a wiring space 47 located on one end side in the axial direction, as shown in FIG. 3. The resin plate 37 according to this embodiment includes thick walled portions 37a that are relatively thick, and thin walled portions 37b that are relatively thin. The thin walled portions 37b are provided at positions to equally divide the resin plate 37 into six parts in the circumferential direction.

The exciting coil 38 is formed by winding in the coil storage space 46 of the coil bobbin 36 before the coil bobbin 36 is inserted into the yoke 22. The winding start end and the winding terminal end of the exciting coil 38 are connected to the lead wires 42 via solderless terminals (not shown), respectively. Each lead wire 42 is led to the lead wire holding portion 41 via the wiring space 47 in the coil bobbin 36, passed through the hole 44 for lead wire extraction and the notch 45 of the lead wire holding portion 41, and extracted to the outside of the coil bobbin 36.

As shown in FIG. 12, the lead wire 42 is passed through a wiring hole 51 formed in the electromagnet 21 and the case 24 and extracted to the outside of the mechanical device 23. The wiring hole 51 extends in the axial direction of the yoke 22. One end of the wiring hole 51 opens to the bottom of the coil storage groove 27, and the other end of the wiring hole 51 opens to the outer surface of the case 24, in other words, to the outside of the seal structure. The wiring hole 51 according to this embodiment is formed by the through hole 35 of the case 24, the concave portion 33 of the yoke 22, and the insertion hole 34 that communicates the concave portion 33 and the coil storage groove 27 with each other. One end of the concave portion 33 is connected to the insertion hole 34, and the other end of the concave portion 33 is connected to one end of the through hole 35. The other end of the through hole 35 opens to the outer surface of the case 24, in other words, to the outside of the seal structure. In this embodiment, the through hole 35 of the case 24 corresponds to a "first hole portion" in the present invention, the concave portion 33 corresponds to a "second hole portion", and the insertion hole 34 corresponds to a "communicating hole".

Figure 11:
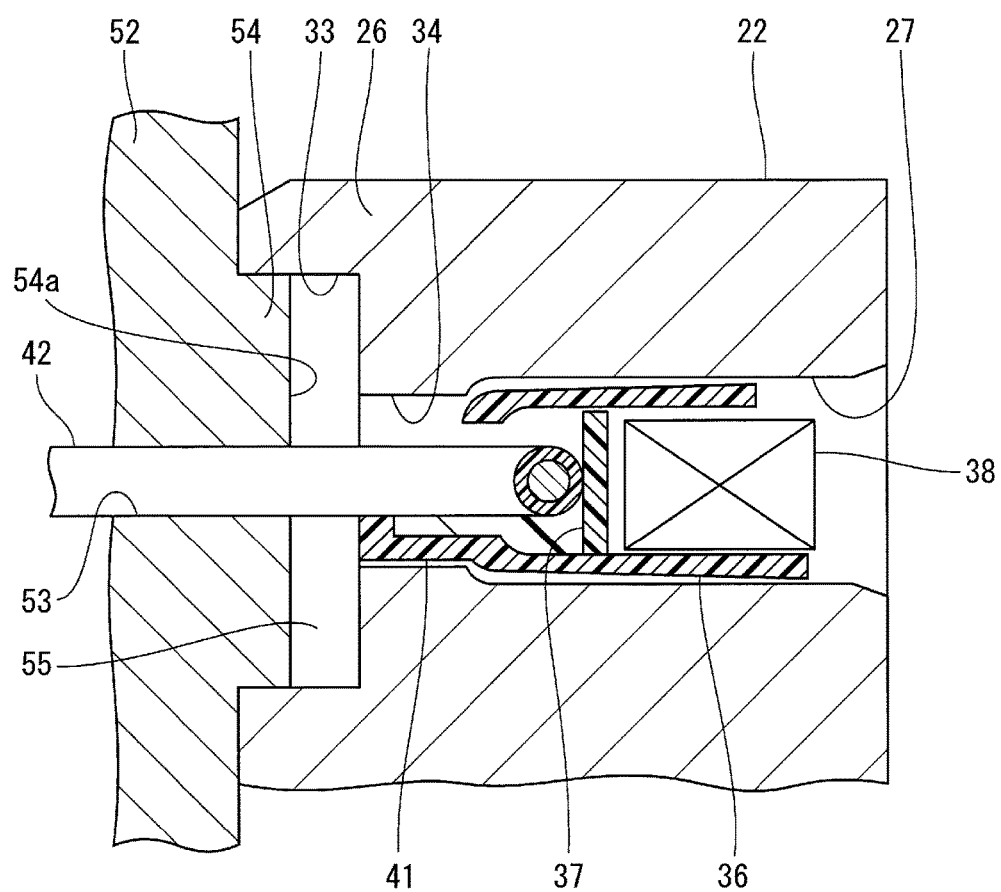
FIG. 11 is a sectional view showing a state in which a die is attached to a yoke.

As shown in FIGS. 2 and 3, the coil bobbin 36 is stored in the coil storage groove 27 of the yoke 22 in a state in which the lead wires 42 are inserted into the concave portion 33 and the insertion hole 34, and the lead wire holding portion 41 is inserted into the insertion hole 34. The insulating resin 39 is packed in the coil storage groove 27 by injection molding in a state in which the coil bobbin 36 storing the exciting coil 38 with the lead wires 42 connected is inserted into the coil storage groove 27. The insulating resin 39 seals the exciting coil 38 and the connecting portion between the exciting coil 38 and the lead wires 42. The packing of the insulating resin 39 is executed in a state in which the concave portion 33 of the yoke 22 is closed by a die 52, as shown in FIG. 11.

The die 52 is provided with holes 53 to pass the lead wires 42, and a disc-shaped projection 54 fitted in the concave portion 33. A distal end face 54a of the projection 54 is a flat surface extending in a direction orthogonal to the axial direction of the yoke 22. The projection 54 has such a projection height that the projection 54 is inserted from the opening edge of the concave portion 33 into the concave portion 33 by a predetermined length so as to form a space 55 for insulating resin formation in the concave portion 33.

When the coil storage groove 27 is filled with the insulating resin 39 in a state in which the die 52 is mounted on the yoke 22, the insulating resin 39 extends from the inside of the coil storage groove 27 up to the concave portion 33 through the insertion hole 34, and extends in the concave portion 33 from the opening of the insertion hole 34 outward in the radial direction (in the direction orthogonal to the axial direction of the yoke 22), as shown in FIG. 3. The insulating resin 39 in the concave portion 33 is called a projecting portion 56. A distal end face 56a of the projecting portion 56 is orthogonal to the axial direction of the yoke 22 in the concave portion 33, and forms the substantial bottom surface of the concave portion 33. One end of the seal member 32 (to be described later) contacts the distal end face 56a.

Figure 9:
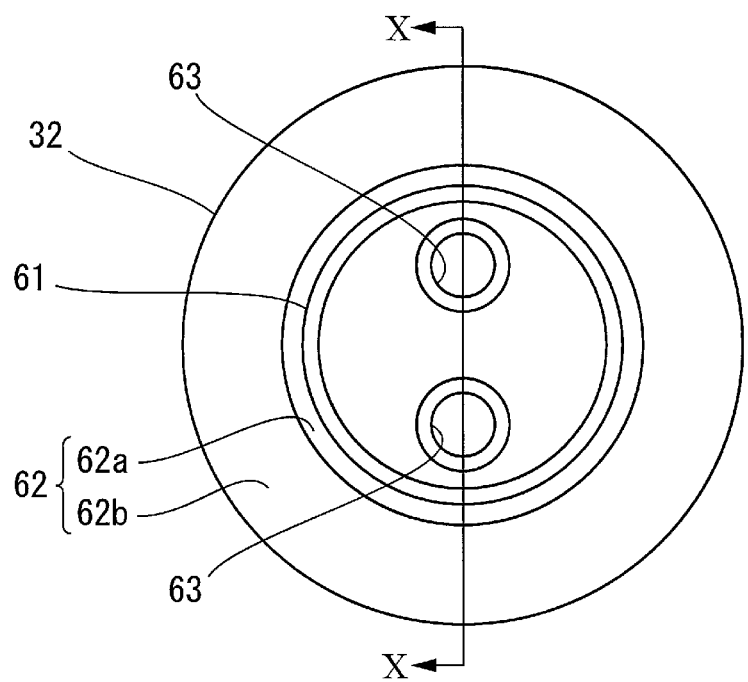
FIG. 9 is a rear view of a seal member.
Figure 10:
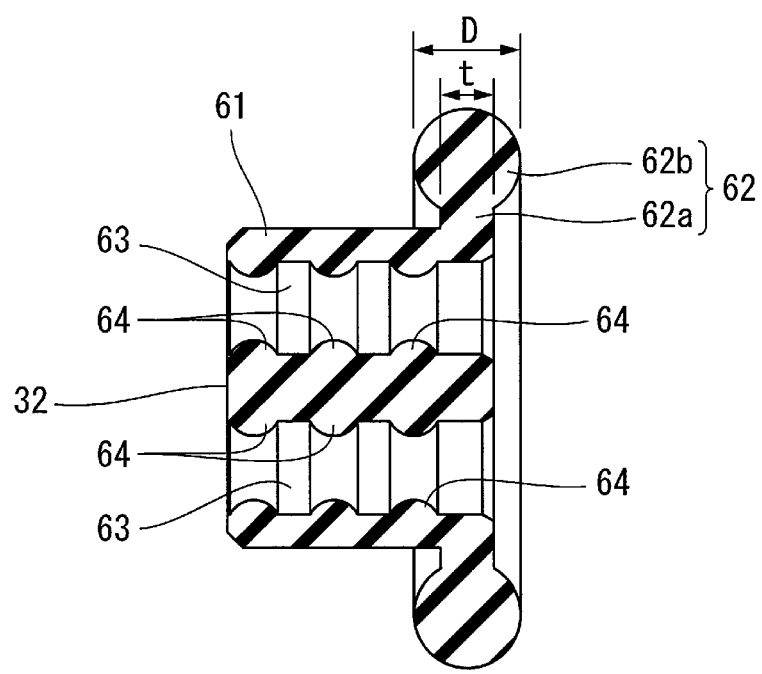
FIG. 10 is a sectional view taken along a line X-X in FIG. 9.

The seal member 32 is configured to seal the lead wire outlet of the electromagnet 21, and is arranged in the wiring hole 51 in a state in which the lead wires 42 are liquid-tightly fitted. As shown in FIGS. 9 and 10, the seal member 32 is formed from a columnar portion 61 having a columnar shape and a relatively small outer diameter, and a flange portion 62 serving as a "plate-shaped portion" extending from one end of the columnar portion 61 outward in the radial direction (the direction orthogonal to the axial direction of the yoke 22). The columnar portion 61 and the flange portion 62 are integrally formed by an elastic material such as synthetic rubber having an oil resistance and a water resistance.

The columnar portion 61 is formed into a columnar shape in a size insertable to the through hole 35 (see FIG. 12) of the case 24, and provided with two through holes 63 to pass the two lead wires 42. The through holes 63 extend through the columnar portion 61 and the flange portion 62 in the axial direction of the yoke 22. A plurality of constricting portions 64 arranged at a predetermined interval in the longitudinal direction of the lead wires 42 (the axial direction of the yoke 22) are arranged in the through holes 63, as shown in FIG. 10. The constricting portions 64 are each formed into a ring shape in which the lead wire 42 is fitted in a press-fitted state.

The flange portion 62 includes a disc portion 62a connected to the columnar portion 61, and a seal portion 62b provided on the peripheral portion of the disc portion 62a. The disc portion 62a projects from the columnar portion 61 outward in the radial direction (the direction orthogonal to the axial direction of the yoke 22). As shown in FIGS. 3 and 12, the outer diameter of the flange portion 62 including the disc portion 62a and the seal portion 62b is smaller than the hole diameter of the concave portion 33 of the yoke 22 and larger than the hole diameter of the through hole 35 of the case 4.

The seal portion 62b is formed into a circular section and connected to the entire perimeter of the disc portion 62a to surround the disc portion 62a from outside in the radial direction. An outer diameter D of the circular section of the seal portion 62b with the circular sectional shape (the thickness of the seal portion 62b) is larger than a thickness t of the disc portion 62a. In this embodiment, the seal portion 62b projects to the both sides of the disc portion 62a in the axial direction of the yoke 22. The outer diameter D of the seal portion 62b is larger than the substantial depth of the concave portion 33 of the yoke 22, as shown in FIG. 3. The "substantial depth" here means the distance between the distal end face 56a of the projecting portion 56 and the opening edge of the concave portion 33.

The seal member 32 is mounted on the electromagnet 21 in a state in which the lead wires 42 are press-fitted into the through holes 63, and the flange portion 62 faces the distal end face 56a of the projecting portion 56. In this mounted state, the constricting portions 64 in each through hole 63 come into tight contact with the lead wire 42 by the elasticity of their own, and the lead wires 42 are liquid-tightly fitted in the seal member 32.

The thus configured electromagnet 21 is attached to the case 24 in a state in which the lead wires 42 and the columnar portion 61 of the seal member 32 are inserted into the through hole 35 of the case 24, as shown in FIG. 12. This attaching operation is done by an operator (not shown) by inserting attachment bolts (not shown) into bolt through holes (not shown) of the case 24 and screwing the bolts into the screw holes 25 of the yoke 22. When the electromagnet 21 is attached to the case 24, the seal portion 62b of the seal member 32 is sandwiched and compressed between the device inner surface 24a of the case 24 and the distal end face 56a of the projecting portion 56 of the insulating resin 39 (the substantial bottom surface of the concave portion 33). In this embodiment, the device inner surface 24a of the case 24 corresponds to a "hole wall surface extending from a boundary between the first hole portion and the second hole portion in a direction orthogonal to the axial direction of the yoke".

The distal end face 56a of the projecting portion 56 of the insulating resin 39 is formed flat using the die 52, and can therefore liquid-tightly contact the seal portion 62b. When the seal portion 62b of the seal member 32 comes into tight contact with the distal end face 56a, a first entry path 57 and a second entry path 58 of oil or water reaching the lead wires 42 along the insulating resin 39 are cut off. The first entry path 57 is formed along the coil storage groove 27 when the insulating resin 39 peels off from the yoke 22 due to a vibration. The oil in the device penetrates into the first entry path 57 and enters a small gap S in the concave portion 33. The second entry path 58 is formed by a small gap formed at the joining portion between the yoke 22 and the case 24.

If water such as rainwater is splashed on the device outer surface of the case 24, this water may move from the through hole 35 of the case 24 along the device inner surface 24a of the case 24 and enter the small gap S of the concave portion 33. However, since the first entry path 57 and the second entry path 58 are cut off by the tight contact portion between the seal portion 62b and the distal end face 56a, the oil or water that has entered the small gap S never penetrates to the side of the lead wire 42.

The rainwater or the like splashed on the outer surface of the case 24 moves along the outer surface of the lead wire 42 extracted from the case and enters the through hole 63 of the seal member 32. However, since waterproofing is done in the through hole 63 by the plurality of constricting portions 64, the water never moves along the lead wire 42 and penetrates into the exciting coil 38. For this reason, the moisture resistance of the electromagnet 21 is also improved using the seal member 32. Hence, according to this embodiment, it is possible to provide a seal structure for an electromagnet lead wire, which ensures high sealing properties for a portion through which the lead wire 42 of the exciting coil 38 extends and prevents an insulation fault from occurring in an energized portion.

The wiring hole 51 according to this embodiment is formed by the through hole 35 (first hole portion) of the case 24, the concave portion 33 (second hole portion) of the yoke 22, and the insertion hole 34 (communicating hole), and extends through the case 24 and the yoke 22. The insulating resin 39 fills the coil storage groove 27, the insertion hole 34, and part of the concave portion 33. The flange portion 62 (plate-shaped portion) of the seal member 32 is sandwiched and compressed between the distal end face 56a of the insulating resin 39 and the device inner surface 24a of the case 24 in a state in which the yoke 22 is attached to the case 24. The thus configured seal structure 31 is set in a seal state by attaching the yoke 22 to the case 24. Hence, when attaching the electromagnet 21 to the case 24, the operator can reliably set the seal structure 31 in the seal state without concern for the force of fastening the flange portion 62 by the insulating resin 39 and the case 24. Hence, according to this embodiment, it is possible to provide a seal structure for an electromagnet lead wire, which not only ensures high sealing properties but also facilitates the assembly operation.

The flange portion 62 of the seal member 32 according to this embodiment includes the disc portion 62a extending in the radial direction of the columnar portion 61, and the seal portion 62b provided on the entire perimeter of the disc portion 62a. The seal portion 62b is formed into a circular section whose outer diameter is larger than the thickness of the disc portion 62a. The flange portion 62 of the seal member 32 contacts the distal end face 56a of the insulating resin 39 mainly at the seal portion 62b. Hence, according to this embodiment, it is possible to provide a seal structure for an electromagnet lead wire, which further improves the sealing properties because the contact pressure between the seal member 32 and the insulating resin 39 rises.

Each through hole 63 of the seal member 32 according to this embodiment through which the lead wire 42 extends includes the plurality of constricting portions 64 arranged at a predetermined interval in the axial direction. The constricting portions 64 are each formed into a ring shape in which the lead wire 42 is fitted in a press-fitted state. For this reason, the entry path of water that moves along the lead wire 42 from outside of the device and enters the electromagnet 21 is cut by the constricting portions 64. Hence, according to this embodiment, it is possible to provide a seal structure for an electromagnet lead wire, which has high waterproofness as well.

Second Embodiment

Figure 13:
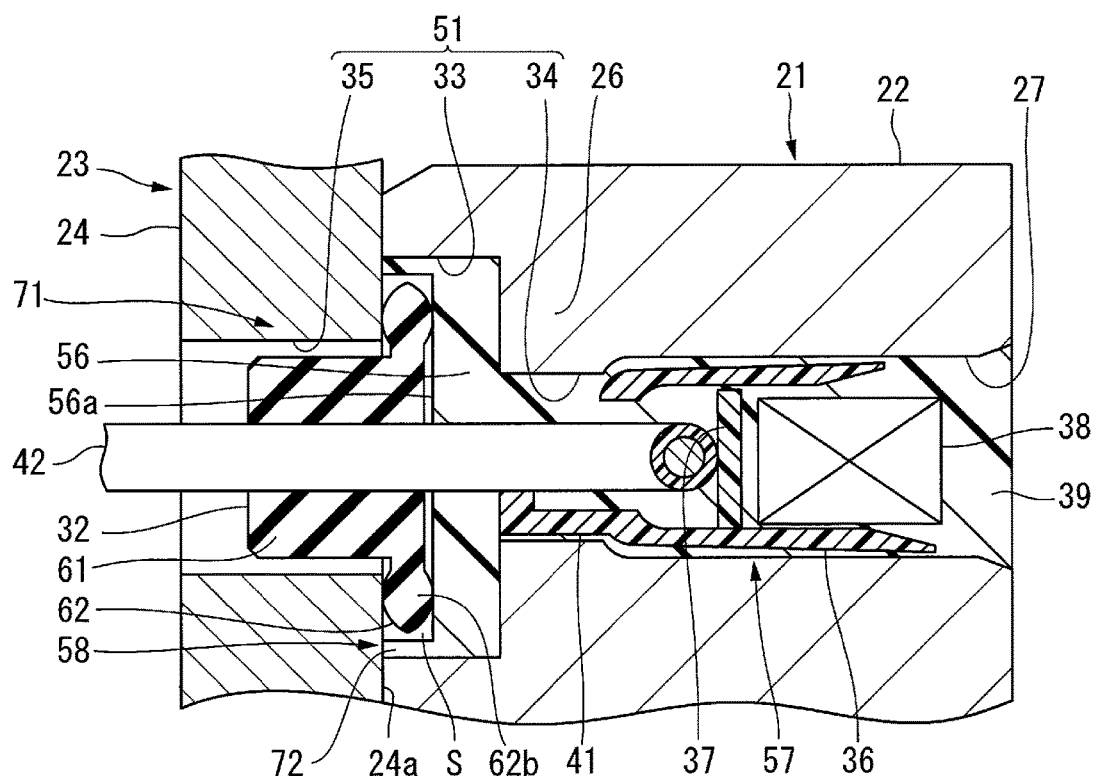
FIG. 13 is a sectional view showing a seal structure for an electromagnet lead wire according to the second embodiment.

A seal structure for an electromagnet lead wire according to the second embodiment of the present invention is configured as shown in FIG. 13. The same reference numerals as in FIGS. 1 to 12 denote the same or similar members in FIG. 13, and a detailed description thereof will appropriately be omitted. A seal structure 71 for an electromagnet lead wire shown in FIG. 13 is different from the seal structure 31 described in the first embodiment only in a projecting portion 56 of an insulating resin 39, and the rest of the structure is the same.

The projecting portion 56 of the insulating resin 39 according to this embodiment is provided with a cylinder 72 serving as a "standing portion" extending from the outer edge of a distal end face 56a in the axial direction of a yoke 22. The inner surface (the hole wall surface of a second hole portion extending in the axial direction) of a concave portion 33 of the yoke 22 is covered with the cylinder 72. The cylinder 72 is molded integrally with the projecting portion 56 in the process of filling a coil storage groove 27 with the insulating resin 39. The distal end of the cylinder 72 is located on the same plane as the end face of the yoke 22. For this reason, in a state in which an electromagnet 21 is attached to a case 24, the distal end face of the cylinder 72 is in tight contact with a device inner surface 24a.

According to this embodiment, the total length of a first entry path 57 and a second entry path 58, through which oil in a mechanical device 23 passes when penetrating into a small gap S in the concave portion 33, is shortened by the length of the cylinder 72. Hence, according to this embodiment, it is possible to provide a seal structure for an electromagnet lead wire with higher sealing properties.

Third Embodiment

Figure 14:
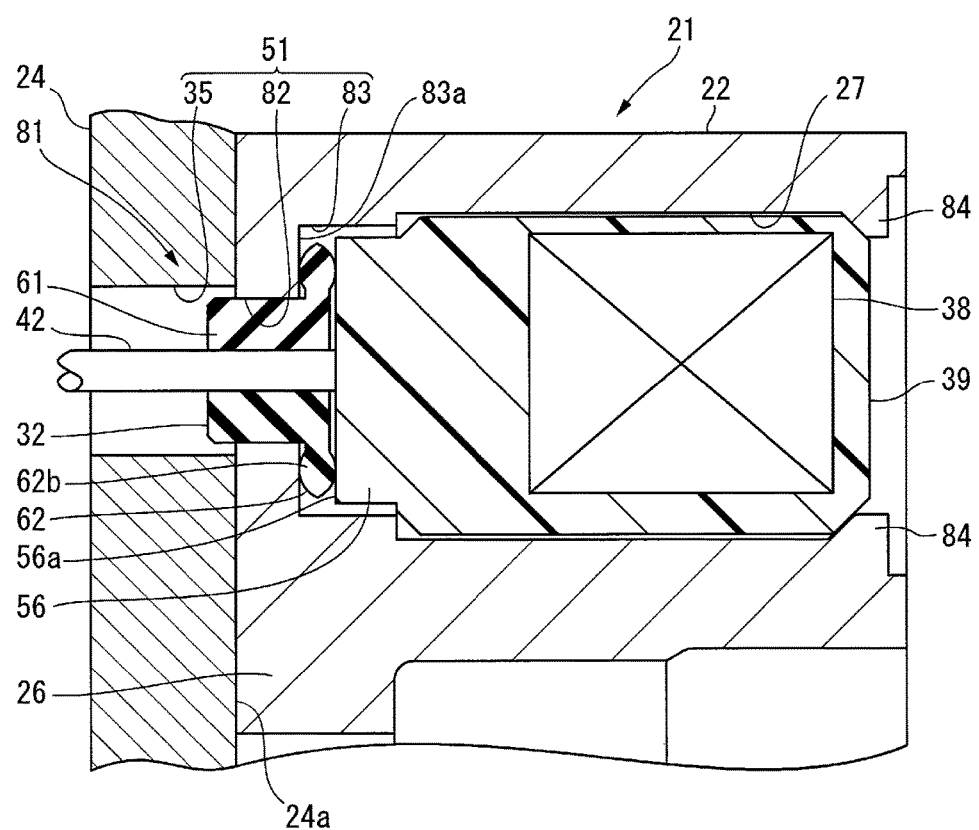
FIG. 14 is a sectional view showing a seal structure for an electromagnet lead wire according to the third embodiment.
Figure 15:
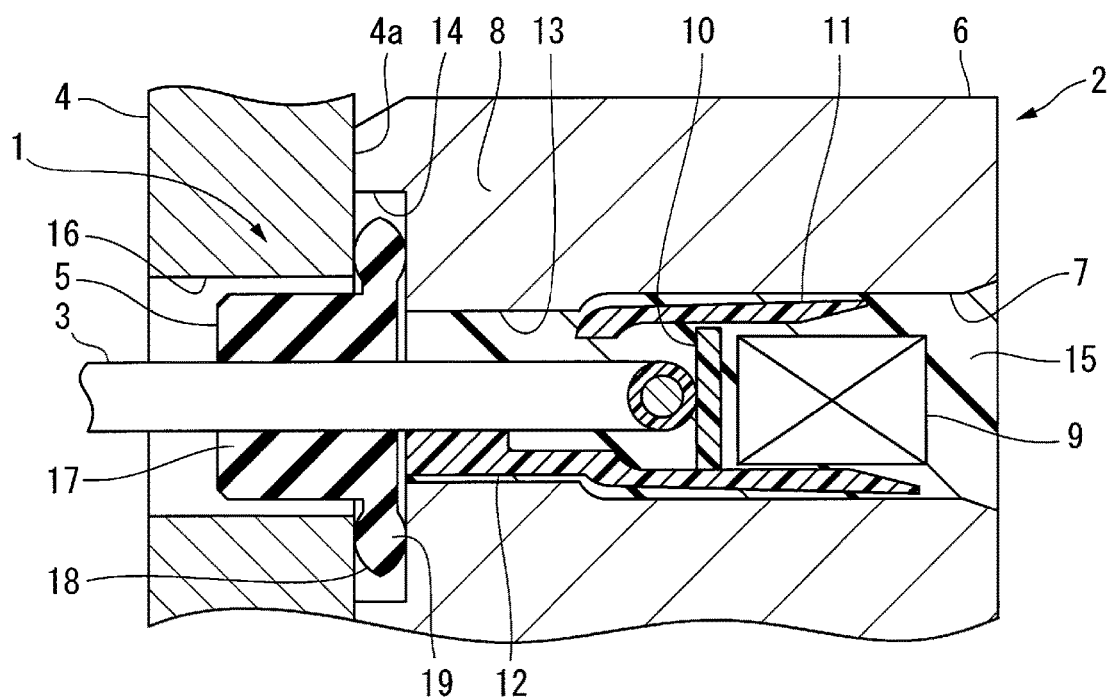
FIG. 15 is a sectional view showing a seal structure for an electromagnet lead wire associated with the present invention.

A seal structure for an electromagnet lead wire according to the third embodiment of the present invention is configured as shown in FIG. 14. The same reference numerals as in FIGS. 1 to 12 denote the same or similar members in FIG. 14, and a detailed description thereof will appropriately be omitted. A seal structure 81 for an electromagnet lead wire according to this embodiment can be implemented without using the constituent members of a mechanical device 23.

In this embodiment, a through hole 82 and a concave portion 83 are formed in an annular wall 26 that forms the bottom of a coil storage groove 27. The through hole 82 extends in the axial direction of a yoke 22 and opens to the outer surface of the yoke 22 and a bottom surface 83a of the concave portion 83. The hole diameter of the through hole 82 allows a columnar portion 61 of a seal member 32 to be press-fitted. The concave portion 83 opens to the bottom of the coil storage groove 27. The hole diameter of the concave portion 83 is larger than the hole diameter of the through hole 82 and is equal to or slightly smaller than the opening width of the coil storage groove 27. A wiring hole 51 according to this embodiment is formed by a through hole 35 of a case 24 of the device attached to the yoke 22, and the through hole 82 and the concave portion 83 described above, and extends through the case 24 and the yoke 22. The through hole 35 of the case 24 and the through hole 82 of the annular wall 26 correspond to a "first hole portion" in the present invention, and the concave portion 83 of the annular wall 26 corresponds to a "second hole portion".

The columnar portion 61 of the seal member 32 according to this embodiment is press-fitted from the side of the concave portion 83 into the through hole 82 in a state in which a lead wire 42 extends through it. Hence, a flange portion 62 of the seal member 32 faces the bottom surface 83a of the concave portion 83. In this embodiment, the bottom surface 83a of the concave portion 83 corresponds to a "hole wall surface extending from a boundary between the first hole portion and the second hole portion in a direction orthogonal to the axial direction of the yoke".

An insulating resin 39 according to this embodiment is molded into an annular shape insertable into the coil storage groove 27 using a dedicated die (not shown). An exciting coil 38 and the connecting portion between the exciting coil 38 and the lead wires 42 are buried in the insulating resin 39. For this reason, the insulating resin 39 according to this embodiment forms a coil assembly together with the exciting coil 38 inside. A projecting portion 56 inserted into the concave portion 83 is formed at one end of the insulating resin 39 in the axial direction of the yoke 22. A distal end face 56a of the projecting portion 56 is a flat surface orthogonal to the axial direction of the yoke 22.

The coil storage groove 27 opens to the other end of the yoke 22. The other end of the yoke 22 is provided with a plurality of caulked pieces 84 configured to prevent coil disconnection. The caulked pieces 84 are formed by press-working part of the yoke 22 to cause plastic flow of the part of the yoke 22. The caulked pieces 84 project inward from the other end of the yoke 22 (the opening edge of the coil storage groove 27) and contact the other end of the insulating resin 39 stored in the coil storage groove 27 from the opposite side of the bottom of the coil storage groove 27.

The projecting portion 56 of the insulating resin 39 according to this embodiment is pressed against the flange portion 62 of the seal member 32 by a pressing force applied to the coil assembly when forming the caulked pieces 84. For this reason, a seal portion 62b of the flange portion 62 of the seal member 32 is compressed and deformed by the bottom surface 83a of the concave portion 83 and the projecting portion 56 of the insulating resin 39 and brought into tight contact with the distal end face 56a of the projecting portion 56. Hence, in this embodiment as well, the entry path of oil or water that moves along the insulating resin 39 and penetrates up to the lead wire 42 is cut by the seal portion 62b. It is therefore possible to provide a seal structure for an electromagnet lead wire, which ensures high sealing properties and prevents an insulation fault from occurring in an energized portion.

The yoke 22 according to this embodiment is provided with the caulked pieces 84 that come, from the opposite side of the bottom of the coil storage groove 27, into contact with the end of the insulating resin 39 stored in the coil storage groove 27.

The seal structure 81 for an electromagnet lead wire according to this embodiment can be implemented by the electromagnet solely without using the case 24 of the mechanical device 23. This is because the flange portion 62 of the seal member 32 is compressed not by a device inner surface 24a of the case 24 but by the bottom surface 83a of the concave portion 83 and the distal end face 56a of the projecting portion 56 in the yoke 22. For this reason, the electromagnet 21 that employs the seal structure 81 can easily be attached to the case 24 of the mechanical device 23.

In the above-described embodiments, an example in which the seal portion 62b having a circular section is provided on the flange portion 62 of the seal member 32 has been described. However, the flange portion 62 of the seal member 32 can be formed into a flat plate shape without the seal portion 62b.

What is claimed is:

1. A seal structure for an electromagnet lead wire, comprising:
   an annular yoke including an annular groove configured to store an exciting coil;
   a wiring hole extending in an axial direction of the yoke, opening to a bottom of the annular groove and an outside of the seal structure and configured to pass a lead wire connected to the exciting coil;
   an insulating resin configured to seal the exciting coil and a connecting portion between the exciting coil and the lead wire; and
   a seal member made of an elastic material and arranged in the wiring hole in a state in which the lead wire is liquid-tightly fitted, wherein the wiring hole includes:
a first hole portion including one end and the other end opening to the outside of the seal structure; and
a second hole portion connected to the one end of the first hole portion and having an opening width larger than an opening width of the first hole portion,
the insulating resin
extends from an inside of the annular groove up to the second hole portion, and
includes a projecting portion including a distal end face orthogonal to the axial direction in the second hole portion,
the seal member includes:
a columnar portion inserted into the first hole portion;
a plate-shaped portion extending in a direction orthogonal to the axial direction in the second hole portion; and
a through hole extending through the columnar portion and the plate-shaped portion and configured to receive the lead wire, and
the plate-shaped portion is sandwiched and compressed between the distal end face of the projecting portion and a hole wall surface extending from a boundary between the first hole portion and the second hole portion in the direction orthogonal to the axial direction,
wherein the opening width of the second hole portion is larger than an opening width of the annular groove, and
the projecting portion extends in the direction orthogonal to the axial direction in the second hole portion.

2. The structure according to claim 1, further comprising a case of a device to which the yoke is attached,
wherein the wiring hole extends through the yoke and the case,
the first hole portion is formed in the case,
the second hole portion is formed in the yoke,
the insulating resin fills the annular groove and part of the second hole portion, and
the plate-shaped portion is sandwiched and compressed between the distal end face of the projecting portion and an inner surface of the case in a state in which the yoke is attached to the case.

3. The structure according to claim 1, wherein the yoke further includes a communicating hole configured to communicate the second hole portion with the annular groove, and
the insulating resin further fills the communicating hole.

4. The structure according to claim 1, wherein the insulating resin further includes a standing portion extending from an outer edge of the distal end face in the axial direction, and
a hole wall surface of the second hole portion extending in the axial direction is covered with the standing portion.

5. The structure according to claim 1, wherein the plate-shaped portion of the seal member includes:
a disc portion connected to the columnar portion and projecting from the columnar portion in the direction orthogonal to the axial direction; and
a seal portion provided on an entire perimeter of the disc portion and having a circular section and an outer diameter larger than a thickness of the disc portion.

6. The structure according to claim 1, wherein the seal member further includes a plurality of constricting portions arranged in the through hole at a predetermined interval in the axial direction and each formed into a ring shape in which the lead wire is fitted in a press-fitted state.

7. A seal structure for an electromagnet lead wire, comprising:
an annular yoke including an annular groove configured to store an exciting coil;
a wiring hole extending in an axial direction of the yoke, opening to a bottom of the annular groove and an outside of the seal structure and configured to pass a lead wire connected to the exciting coil;
an insulating resin configured to seal the exciting coil and a connecting portion between the exciting coil and the lead wire; and
a seal member made of an elastic material and arranged in the wiring hole in a state in which the lead wire is liquid-tightly fitted,
wherein the wiring hole includes:
a first hole portion including one end and the other end opening to the outside of the seal structure; and
a second hole portion connected to the one end of the first hole portion and having an opening width larger than an opening width of the first hole portion,
the insulating resin
extends from an inside of the annular groove up to the second hole portion, and
includes a projecting portion including a distal end face orthogonal to the axial direction in the second hole portion,
the seal member includes:
a columnar portion inserted into the first hole portion;
a plate-shaped portion extending in a direction orthogonal to the axial direction in the second hole portion; and
a through hole extending through the columnar portion and the plate-shaped portion and configured to receive the lead wire, and
the plate-shaped portion is sandwiched and compressed between the distal end face of the projecting portion and a hole wall surface extending from a boundary between the first hole portion and the second hole portion in the direction orthogonal to the axial direction,
wherein the yoke further includes an annular wall located at one end of the yoke in the axial direction,
the first hole portion and the second hole portion are formed in the annular wall,
the annular groove opens to the other end of the yoke,
the insulating resin is formed into an annular shape insertable into the annular groove, and
the yoke includes a caulked piece projecting from the other end to an inside of the annular groove and being in contact with an end of the insulating resin stored in the annular groove.

8. The structure according to claim 7, wherein the plate-shaped portion of the seal member includes:
a disc portion connected to the columnar portion and projecting from the columnar portion in the direction orthogonal to the axial direction; and
a seal portion provided on an entire perimeter of the disc portion and having a circular section and an outer diameter larger than a thickness of the disc portion.

9. The structure according to claim 7, wherein the seal member further includes a plurality of constricting portions arranged in the through hole at a predetermined interval in the axial direction and each formed into a ring shape in which the lead wire is fitted in a press-fitted state.

* * * * *